United States Patent [19]

Hasegawa

[11] Patent Number: 4,998,276

[45] Date of Patent: Mar. 5, 1991

[54] DIAL SIGNAL GENERATOR FOR GENERATING DIAL PULSE SIGNAL AND DUAL TONE MULTI-FREQUENCY SIGNAL

[75] Inventor: Takashi Hasegawa, Kawasaki, Japan

[73] Assignee: Fujitsu Limited, Kawasaki, Japan

[21] Appl. No.: 356,902

[22] Filed: May 25, 1989

[30] Foreign Application Priority Data

Jun. 10, 1988 [JP] Japan .................................. 63-143138

[51] Int. Cl.⁵ ............................................. H04M 1/00
[52] U.S. Cl. ........................................ 379/361; 379/362
[58] Field of Search ................. 379/361, 362, 355, 387

[56] References Cited

U.S. PATENT DOCUMENTS 4,598,174  7/1986  Pommer, II ........................ 379/361

FOREIGN PATENT DOCUMENTS 0012843  1/1985  Japan ................................... 379/361
0093760  5/1986  Japan ................................... 379/361
0247150 11/1986  Japan ................................... 379/361

OTHER PUBLICATIONS

"The Ambassador Range of Telephones-Development of the Keypad and Signalling Circuitry", A. N. Child et al., Post of Electrial Engineering Jouranl, vol. 74, 1-1982, pp. 314-321.

Primary Examiner—Jin F. Ng
Assistant Examiner—Jhancy Augustus
Attorney, Agent, or Firm—Armstrong, Nikaido Mamelstein Kubovcik & Murray

[57] ABSTRACT

A dial signal generator supplied with dial data corresponding to a dial number, includes a dial data register for storing the dial data, a decoder for decoding the dial data supplied from the dial data register to thereby generate corresponding row and column numbers based on a dual tone multi-frequency (DTMF) system, a DTMF generator for generating a DTMF signal from the row and column numbers generated by the decoder, and a dial pulse generator for generating a dial pulse signal from the dial data supplied from the dial data register.

9 Claims, 6 Drawing Sheets

| DIAL NO. | DIAL DATA | LOW NO. | COLUMN NO. |
|---|---|---|---|
| 1 | 1 | 1 | 1 |
| 2 | 2 | 1 | 2 |
| 3 | 3 | 1 | 3 |
| 4 | 4 | 2 | 1 |
| 5 | 5 | 2 | 2 |
| 6 | 6 | 2 | 3 |
| 7 | 7 | 3 | 1 |
| 8 | 8 | 3 | 2 |
| 9 | 9 | 3 | 3 |
| 0 | 10 | 4 | 1 |
| * | 11 | 4 | 2 |
| # | 12 | 4 | 3 |
| A | 13 | 1 | 4 |
| B | 14 | 2 | 4 |
| C | 15 | 3 | 4 |
| D | 0 | 4 | 4 |

DIAL SIGNAL GENERATOR FOR GENERATING DIAL PULSE SIGNAL AND DUAL TONE MULTI-FREQUENCY SIGNAL

BACKGROUND OF THE INVENTION

The present invention generally relates to a dial signal generator, and particularly to a dial signal generator of generating dial signals of the pulse type and dual tone multi-frequency type.

Recently, a variety of functions of a telephone set have been proposed. Currently, a telephone set capable of selectively sending two different types of dial signals is available. Generally, the two different types of dial signals are of the dial pulse (DP) type and the dual tone multi-frequency type (hereafter simply referred to as DTMF type). Such telephone sets are provided with a dial signal generator which generates a dial pulse signal and a DTMF signal.

Figure 1A:
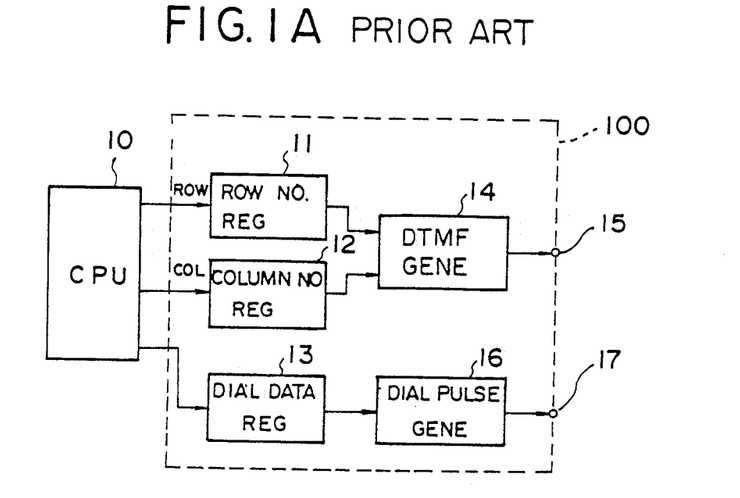
FIG. 1A is a block diagram of a conventional dial signal generator.
Figure 1B:
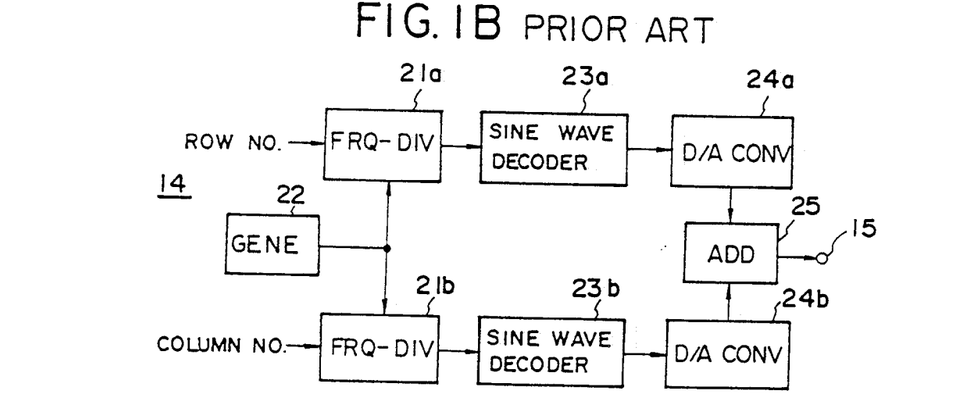
FIG. 1B, is a block diagram of a DTMF generator used in the dial signal generator shown in FIG. 1A.

A conventional dial signal generator is described with reference to FIGS. 1A, 1B and 1C. Referring to FIG. 1A, there is illustrated a conventional dial signal generator. A dial signal generator 100 is connected to a central processing unit (hereafter simply referred to as a CPU) 10. The CPU 10 selects a DTMF mode and a dial pulse mode. In the DTMF mode, the CPU 10 generates a row number and a column number corresponding to a dial number to be sent. In the dial pulse mode, the CPU 10 generates dial data (number of pulses) corresponding to a dial number to be sent. The row and column numbers supplied from the CPU 10 are temporarily stored in row-number and column-number registers 11 and 12, respectively. Similarly, the dial data from the CPU 10 is stored in a dial data register 13. FIG. 2 illustrates the correspondence among the dial number, dial data, row number and column number.

In the DTMF mode, the row and column numbers stored in the corresponding registers 11 and 12 are supplied to a dial tone multi-frequency generator (hereafter simply referred to as a DTMF generator) 14. An example of the structure for the DTMF generator 14 is illustrated in FIG. 1B. As shown, the DTMF generator 14 is made up of programmable frequency dividers 21a, 21b, a clock generator 22, sine wave decoders 23a, 23b, digital-to-analog converters (D/A converters) 24a, 24b and an adder 25. The row number is read out of the row-number register 11 and supplied to the programmable frequency-divider 21a. Similarly, the column number is read out of the column-number register 11 and supplied to the programmable frequency-divider 21b. The programmable frequency-dividers 21a and 21b count a pulse signal derived from the clock generator 22 in accordance with the respective values of the frequency dividing ratio programed therein. The counted values in the programmable frequency-dividers 21a and 21b are converted into sine wave data by the sine wave decoders 23a and 23b, respectively. Then the sine wave data from the sine wave decoders 23a and 23b are converted into analog signals by the D/A converts 24a and 24b, respectively. The converted analog signals derived from the D/A converters 24a and 24b are added to each other by the adder 25, and a resultant signal is output through an output terminal 15.

The D/A converter 24a outputs step waves necessary to generate sine waves of frequencies of approximately 697Hz, 770Hz, 852Hz and 941Hz corresponding to row numbers '1', '2', '3' and '4', respectively. Similarly, the D/A converter 24b outputs step waves necessary to generate sine waves of frequencies of approximately 1209Hz, 1336Hz, 1477Hz and 1633Hz corresponding to column numbers '1', '2', '3' and '4', respectively. The adder 25 adds the step signals supplied from the D/A converters 24a and 24b to generate a corresponding DTMF signal. Although not illustrated, a lowpass filter is connected to the output terminal 15, and eliminates unnecessary high-frequency components contained in the DTMF signal derived from the adder 25. A CMOS single chip microcontroller TMP47C456AF manufactured by TOSHIBA includes the aforementioned row- and column-number registers 11 and 12 and the DTMF generator 14.

Figure 1C:
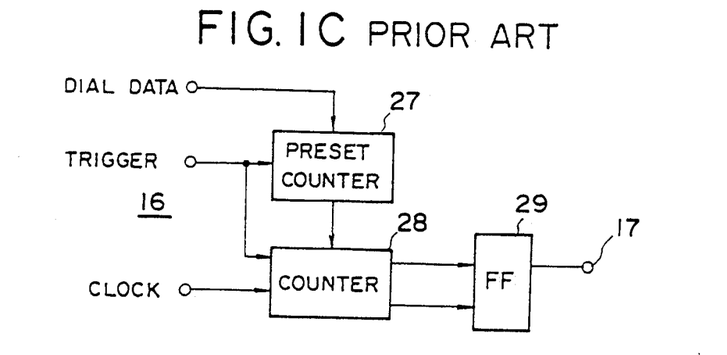
FIG. 1C is a block diagram of a dial pulse generator used in the dial signal generator shown in FIG. 1A.
Figure 2:
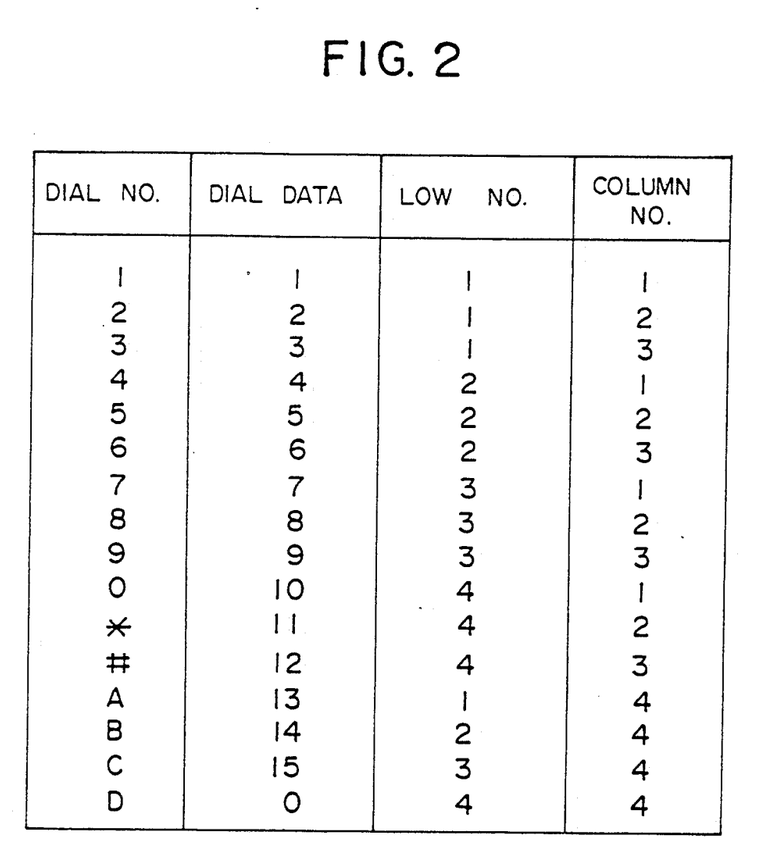
FIG. 2 is a view illustrating the correspondence among the dial number, dial data, row number and column number.

On the other hand, an example of the structure for the dial pulse generator 16 is illustrated in FIG. 1C. The dial data is read out of the dial data register 13 and supplied to a preset counter 27, which starts counting down the dial data supplied from the CPU 10. When the counted value is equal to or larger than '', the preset counter 27 makes a counter 28 in the enabled state. The counter 28 is a 100-nary counter, and counts a clock until the counted value becomes a predetermined number after triggered. When the counted value in the counter 28 becomes equal to the predetermined value, the counter 28 alternately outputs set and reset pulses to a flip-flop 29. Then the flip-flop 29 outputs the dial pulse having a certain value of the duty ratio, which is output through an output terminal 17.

However, the aforementioned conventional dial signal generator presents the following disadvantages. It is required to process two signal systems consisting of the row and column numbers and the dial data with respect to the dial number. Therefore, the CPU 10 must handle a large amount of control program necessary to output the row and column numbers and the dial data. The above requires a memory having a large amount of storage capacity, and prevents the miniaturization of the entire system including the dial signal generator.

SUMMARY OF THE INVENTION

It is therefore a general object of the present invention to provide an improved dial signal generator capable of generating a dial pulse signal and a DTMF signal.

A more specific object of the present invention is to provide a dial signal generator which does not require a large amount of control program and makes it possible to use a memory efficiently.

The above objects of the present invention can be achieved by a dial signal generator supplied with dial data corresponding to a dial number, including a dial data register for storing the dial data, a decoder for decoding the dial data supplied from the dial data register to thereby generate corresponding row and column numbers based on a dual tone multi-frequency (DTMF) system, a DTMF generator for generating a DTMF signal from the row and column numbers generated by the decoder, and a dial pulse generator for generating a dial pulse signal from the dial data supplied from the dial data register.

Other objects, features and advantages of the present invention will become apparent from the following detailed description when read in conjunction with the accompanying drawings.

DESCRIPTION OF THE PREFERRED EMBODIMENTS

Figure 3:
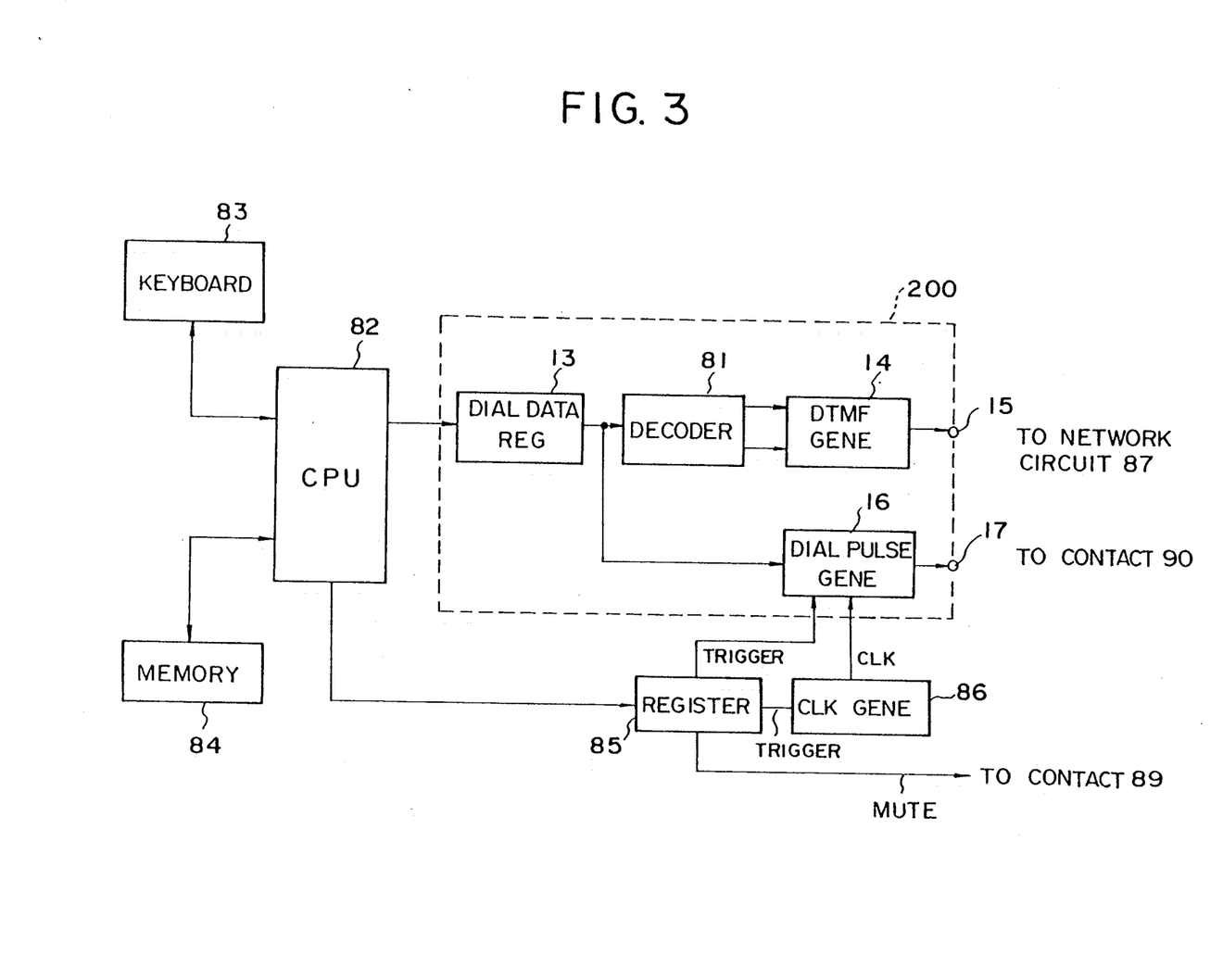
FIG. 3 is a block diagram of a system having a preferred embodiment of the present invention.

A description is given of a preferred embodiment of the present invention. Referring to FIG. 3, there is illustrated a microcomputer system (except for a keyboard) which employs a dial signal generator 200 of the present invention. In FIG. 3, those parts which are the same as those in the previous figures are given the same reference numerals. The dial signal generator 200 includes a decoder 81 together with the dial register 13, the DTMF generator 14 and the dial pulse generator 16, which are also used in the aforementioned conventional dial signal generator. It can be seen from a comparison between FIGS. 1A and 3 that the decoder 81 is substituted for the row-number register 11 and the column-number register 12. The dial signal generator 200 is controlled by a CPU 82. The CPU 82 generates dial data corresponding to the dial number supplied from a keyboard 83. It is noted that the CPU 82 does not generate the row number and the column number. This means that the dial signal generator 200 can generate the DTMF signal and the dial pulse signal only from the dial data supplied from the CPU 82. A memory 84, which is connected to the CPU 82, stores a control program used for controlling the dial signal generator 200, and data handled in the control of the dial signal generator 200.

The dial data derived from the CPU 82 is supplied to and stored in the dial data register 13. The dial data is read out of the dial data register 13 and supplied to the decoder 81 and the dial pulse generator 16. The decoder 81 decodes the dial data supplied from the dial data register 13, and generates the row-number and column-number corresponding to the dial data. On the other hand, the dial pulse generator 16 generates the dial pulse signal corresponding to the received dial data. During this operation, the dial pulse generator 16 uses a trigger signal supplied from the CPU 82 through a register 85, and a clock signal generated by a clock generator 86, which starts generating the clock signal when the trigger signal is supplied from the register 85. The trigger signal and the clock signal are identical to the corresponding signals used in the structure shown in FIG. 1C. The register 85 also outputs a mute signal supplied from the CPU 82. As will described later, the mute signal is used for disconnecting a network circuit controlled from a network when the dial pulse signal is sent in the dial pulse mode. Alternatively, the mute signal connects the network circuit to the network when the DTMF signal is sent in the DTMF mode. The DTMF generator 14 is constructed as shown in FIG. 1B, and the dial pulse generator 16 is constructed as shown in FIG. 1C.

It is sufficient for the CPU 82 to generate only the dial data to generate both the DTMF signal and the dial pulse signal. As a result, it is possible to store a decreased amount of the control program in the memory 84 and thus use the memory 84 efficiently.

Figure 4:
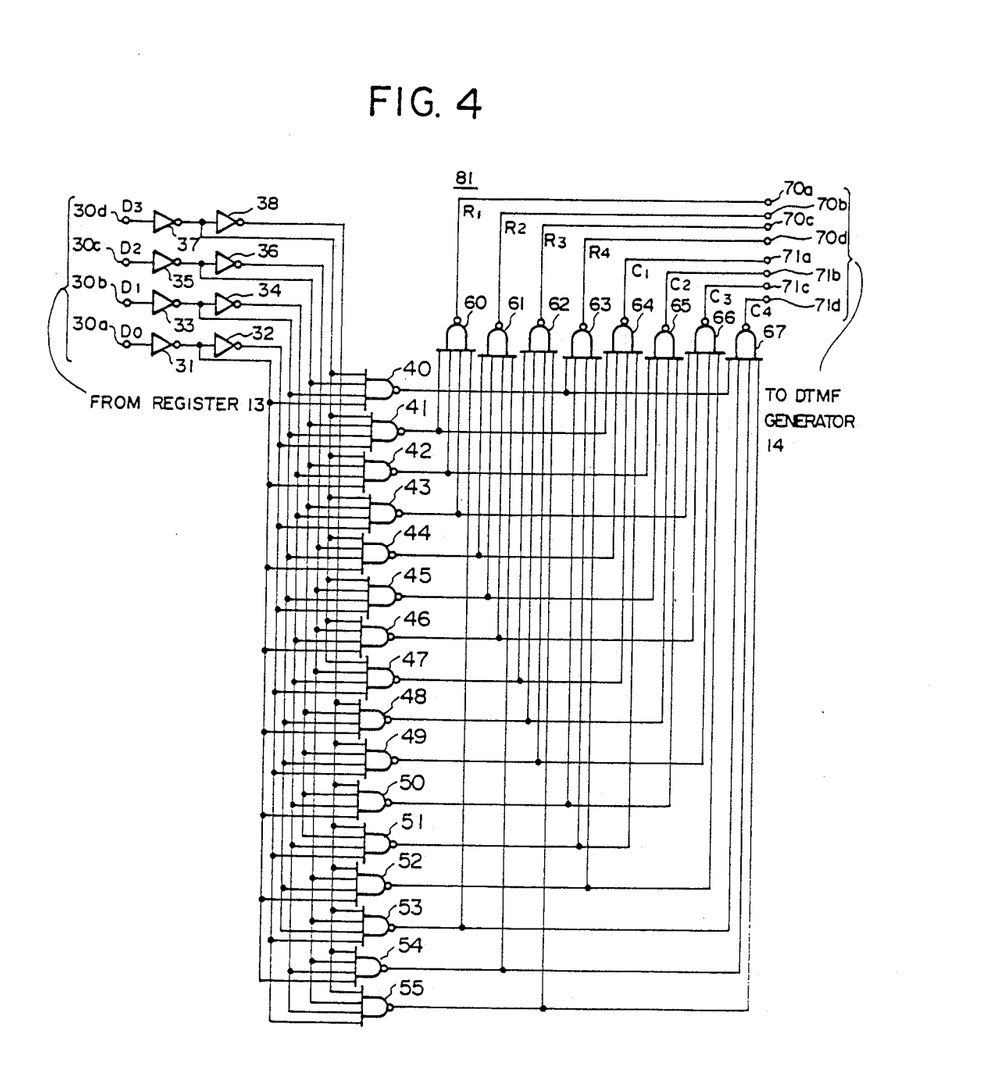
FIG. 4 is a circuit diagram of an example of the structure for a decoder used in the embodiment shown in FIG. 3.

Referring to FIG. 4, there is illustrated an example of the structure for the decoder 81 shown in FIG. 3. The illustrated structure is used in the case where the CPU 82 generates the dial data consisting of 4 bits. Terminals 30a, 30b, 30c and 30d are supplied with 4-bit dial data D0, D1, D2 and D3 which form the dial data shown in FIG. 2. The dial data D0, D1, D2 and D3 are inverted by inverters 31, 33, 35 and 37, respectively. The inverted dial data D0 from the inverter 31 is supplied to NAND gates 40, 42, 44, 46, 48 50, 52 and 54. The inverted dial data D0 from the inverter 31 also passes through an inverter 32, which supplies NAND gates 41, 43, 45, 47, 49, 51, 53 and 55 with the dial data D0. The inverted dial data D1 from the inverter 33 is supplied to the NAND gates 40, 41, 44, 45, 48, 49, 52 and 53. The inverted dial data D1 from the inverter 33 also passes through an inverter 34, which supplies the NAND gates 42, 43, 46, 47, 50, 51, 54 and 55 with the dial data D1. The inverted dial data D2 from the inverter 35 is supplied to the AND gates 40 through 43, and 48 through 51. The inverted dial data D2 from the inverter 35 also passes through an inverter 36, which supplies the NAND gates 44 through 47 and 52 through 55 with the dial data D2. The inverted dial data D3 from the inverter 37 is supplied to the NAND gates 40 through 47. The inverted dial data D3 from the inverter 37 passes through an inverter 38, which supplies the NAND gates 48 through 55 with the dial data D3.

A NAND gate 60 generates, from the signals supplied from the NAND gates 41, 42, 43 and 53, a signal R1 which indicates row number '1'. A NAND gate 61 generates, from the signals supplied from the NAND gates 44, 45, 46 and 54, a signal R2 which indicates row number '2'. A NAND gate 62 generates, from the signals supplied from the NAND gates 47, 48, 49 and 55, a signal R3 which indicates row number '3'. A NAND gate 63 generates, from the signals supplied from the NAND gates 40, 50, 51 and 52, a signal R4 which indicates row number '4'. The signals R1, R2, R3 and R4, which form the row numbers, pass through terminals 70a, 70b, 70c and 70d, respectively, and are then supplied to the DTMF generator 14.

A NAND circuit 64 generates, from the signals supplied from the NAND gates 41, 44, 47 and 51, a signal C1 which indicates column number '1'. A NAND gate 65 generates, from the signals supplied from the NAND gates 42, 45, 48 and 50, a signal C2 which indicates column number '2'. A NAND gate 66 generates, from supplied from the NAND gates 43, 46, 49 and 52, a signal C3 which indicates column number '3'. A NAND gate 67 generates, from the signals supplied from the NAND gates 40, 53, 54 and 55, a signal C4 which indicates column number '4'. The signals C1, C2, C3 and C4, which form the column numbers, pass through terminals 71a, 71b, 71c and 71d, and are then supplied to the DTMF generator 14.

When the dial data D0, D1, D2, D3 corresponding to dial number 'D' are '0000', for example, only the NAND gate 40 among the AND gates 40 through 55 outputs '0'. Thus, the NAND gates 63 and 67, which are supplied with the output signal of the NAND gate 40, output signals R4 and C4 indicating number '1', respectively. As shown in FIG. 2, when both the signals R4 and C4 are '1', the signals R4 and C4 indicate row number '4' and column number '4', respectively.

When the dial data D0, D1, D2 and D3 corresponding to dial number '1' are '0001', for example, only the NAND gate 41 out of the NAND gates 40 through 55 outputs '0'. Therefore, the NAND gates 60 and 64 which are supplied with the output signal of the NAND gate 41, output the signals R1 and C1 indicating '1'. When both the signals R1 and C1 are ,1,, the signals R1 and C1 indicate row number '1' and column number '1', respectively.

As described above, the decoder 81 is a simple circuit constructed by the inverters 31 through 38 and NAND gates 40 through 67. The use of the decoder 81 enables it to be possible to provide a dial signal generator without having the row-number register 11 and the column-number register 12 and construct a microcomputer system operable by a small amount of control program.

Figure 5:
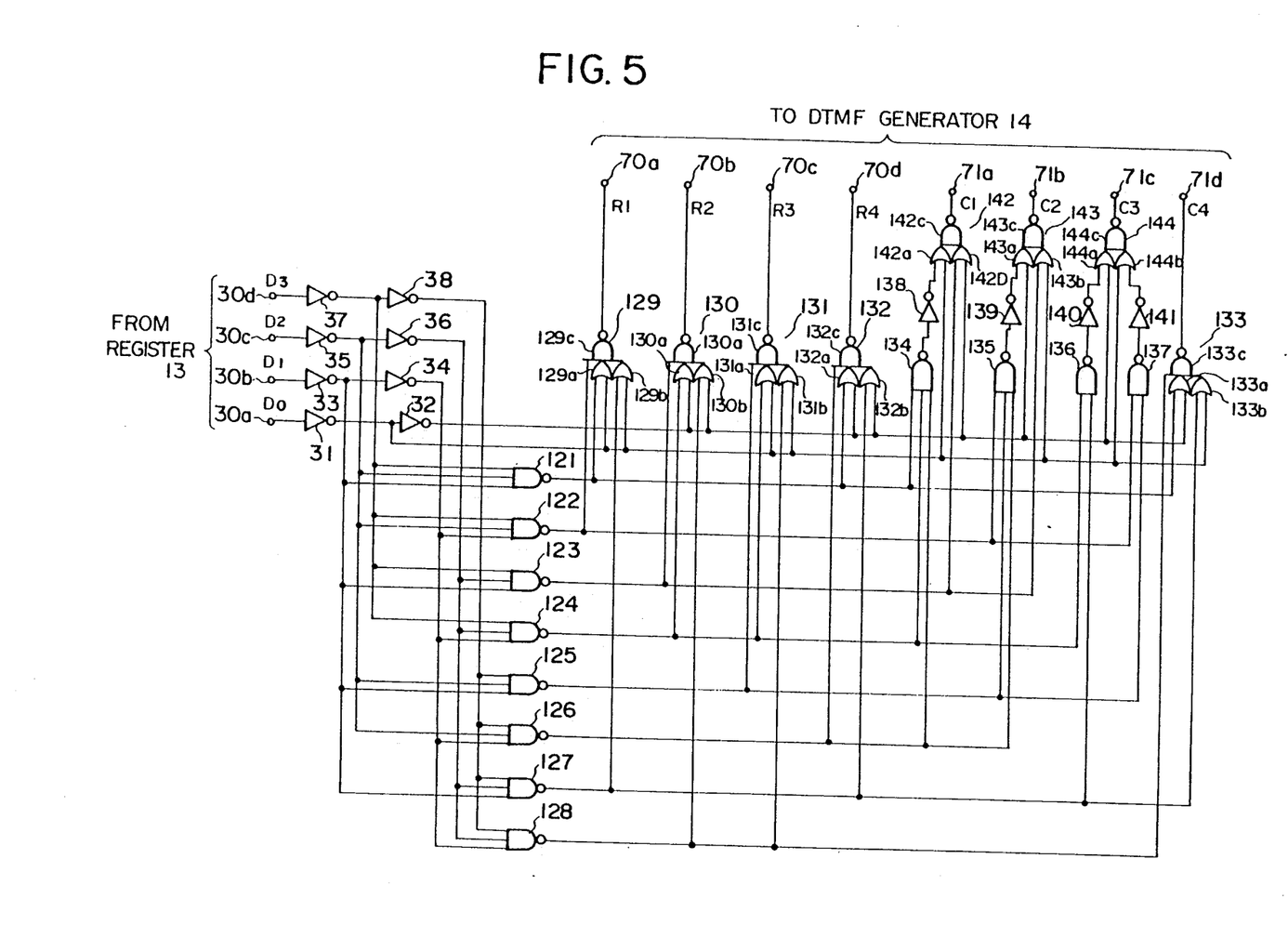
FIG. 5 is a circuit diagram of another example of the structure for the decoder used in the embodiment shown in FIG. 3.

A description is given of another example of the structure for the decoder 81 with reference to FIG. 5. The illustrated structure includes the terminals 30a through 30d, 70a through 70d, and 71a through 71d, and inverters 31 through 38 in the same manner as the configuration of FIG. 3. The inverted dial data D0 supplied from the inverter 31 is supplied to logic gates 129, 131, 133, 142, 143 and 144. The inverted dial data D0 passes through the inverter 32, which supplies logic gates 130, 132, 133, 142, 143 and 144 with the dial data D0. Each of the logic gates 129 through 133 consists of two OR gates such as OR gates 129a and 129b, and a single 3-input NAND gate such as a NAND gate 129c. Each of the logic gates 142 through 144 consists of two OR gates such as OR gates 142a and 142b, and a single 2-input NAND gate such as a NAND gate 142c. The signal supplied from the inverter 31 is supplied to the OR gates 129a, 129b, 131a, 131b, 133b, 142a, 143b and 144b. The signal supplied from the inverter 32 is supplied to the OR gates 130a, 130b, 132a, 132b, 133a, 142b, 143a and 144a.

The inverted dial data D1 supplied frOm the inverter 33 is supplied to NAND gates 121, 123, 125 and 127. The inverted dial data D1 passes through the inverter 34, which supplies NAND gates 122, 124, 126 and 128 with the dial data D1. The inverted dial data D2 is supplied to the NAND gates 121, 122, 125 and 126. The inverted dial data D2 passes through the inverter 36, which supplies the NAND gates 123, 124, 127 and 128 with the dial data D2. The inverted dial data D3 supplied from the inverter 37 is supplied to the NAND gates 121, 122, 123 and 124. The inverted dial data D3 passes through the inverter 38, which supplies the NAND gates 125, 126, 127 and 128 with the dial data D3.

The output signal of the NAND gate 121 is supplied to the OR gates 129a, 132a and 133a, and a NAND gate 135. The output signal of the NAND gate 122 is supplied to the NAND gates 129c, 135 and 137. The output signal of the NAND gate 123 is supplied to the NAND gate 130c and OR gates 142b and 143b. The output signal of the NAND gate 124 is supplied to the OR gates 130a and 131a, and the NAND gates 134 and 136. The output signal of the NAND gate 125 is supplied to the NAND gates 131c, 135 and 137. The output signal of the NAND gate 126 is supplied to the NAND gates 132c, 134 and 135. The output signal of the NAND gate 127 is supplied to the OR gates 129b, 132b and 133b, and the NAND gate 136. The output signal of the NAND gate 128 is supplied to the OR gates 130b and 131b, and the NAND gate 133c.

The logic gate 129 generates the signal R1 which indicates row number '1', from the signals supplied from the inverter 31, and the NAND gates 121, 122 and 127. The logic gate 130 generates the signal R2 which indicates row number '2', from the signals supplied from the inverter 32, and the NAND gates 123, 124 and 128. The logic gate 131 generates the signal R3 which indicates row number '3', from the signals supplied from the inverter 31, and the NAND gates 124, which indicates row number '4', from the signals supplied from the inverter 32, and the NAND gates 121, 126 and 127.

The NAND gate 134 generates a signal from the signals supplied from the NAND gates 121, 124 and 126, and supplies an inverter 138 with the generated signal. The logic gate 142 generates the signal C1 which indicates column number '1', from the signals supplied from the inverters 31, 32 and 138, and the NAND gate 123. The NAND gate 135 generates a signal from the signals supplied from the NAND gates 122, 125 and 126, and supplied an inverter 139 with the generated signal. The logic gate 143 generates the signal C2 which indicates column number '2', from the signals supplied from the inverters 31, 32 and 139, and the NAND gate 123. The NAND gate 136 generates a signal from the signals supplied from the NAND gates 124 and 127, and supplies an inverter 140 with the generated signal. Similarly, the NAND gate 137 generates a signal from the signals supplied from the NAND gates 122 and 125, and supplies an inverter 141 with the generated signal. The logic gate 144 generates the signal C3 which indicates column number '3', from the signals supplied from the inverters 31, 32, 140 and 141. The logic gate 133 generates the signal C4 from the signals supplied from the inverters 31 and 32, and the NAND gates 121 and 127.

Figure 6A:
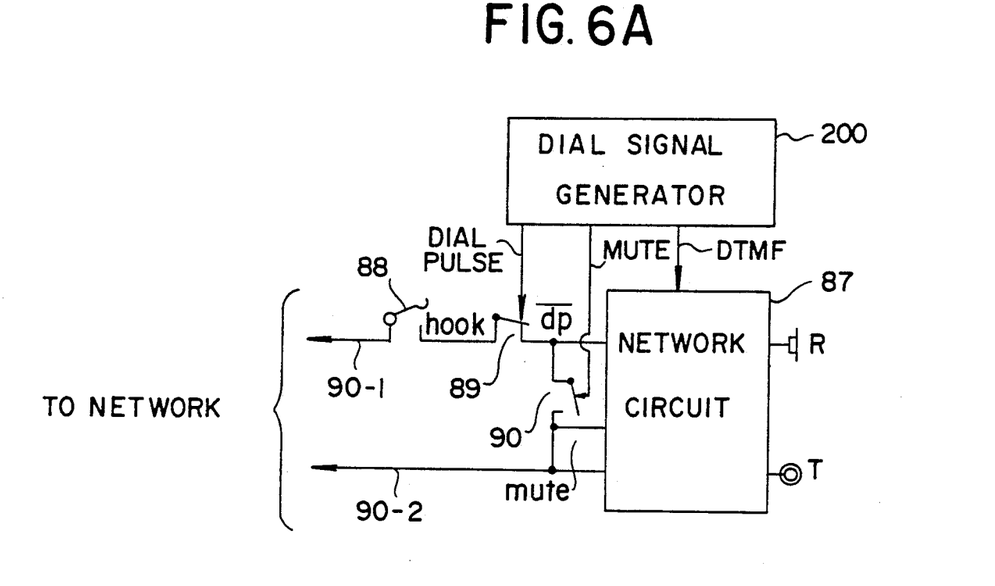
FIGS. 6A and 6B are block diagrams illustrating how to send the dial pulse signal or DTMF signal to a network.
Figure 6B:
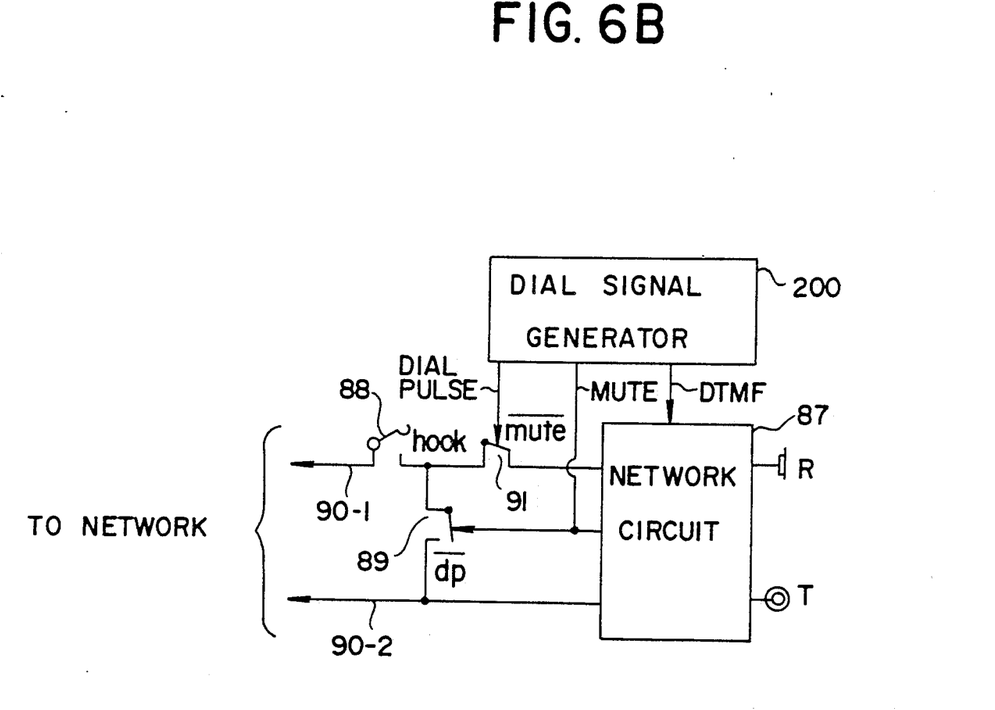

The dial pulse signal and the DTMF signal generated by the dial signal generator 200 are supplied to a network through a configuration shown in FIG. 6A or FIG. 6B. Referring to FIG. 6A, the DTMF signal derived from the dial pulse generator 200 is supplied to a network circuit 87, which generates a voice-level signal from the DTMF signal. A receiver R and a transmitter T are coupled to the network circuit 87. A pair of lines 90-1 and 90-2 to be connected to a network extends from the network circuit 87. A make contact 90 is controlled by the mute signal supplied from the register 85 shown in FIG. 3. When the dial signal generator 200 operates in the dial pulse mode, the mute signal makes the contact 90 closed. On the other hand, when the dial signal generator 200 operates in the DTMF mode, the mute signal keeps the contact 90 open. Thereby, the DTMF signal derived from the network circuit 87 is sent to the network. A break contact 89 is inserted into the line 90-1. The contact 89 is controlled by the dial pulse signal supplied from the dial signal generator 200. A contact 88 inserted into the line 90-1 is a hook contact.

A configuration shown in FIG. 6B differs from the configuration shown in FIG. 6A in that a break contact 91 controlled by the mute signal is interposed between the network switch 87 and the hook contact 88 in place of the make contact 90. When the dial signal generator 200 operates in the dial pulse mode, the mute signal makes the contact 91 open. On the other hand, the dial signal generator 200 operates in the DTMF mode, the mute signal keeps the contact 91 closed.

The present invention is not limited to the above-mentioned embodiments, and variations and modifications may be made without departing from the scope of the present invention.

What is claimed is:

1. A dial signal generator, comprising:
   a central processing unit generating dial data corresponding to a dial number;
   register means for storing said dial data generated by said central processing unit;
   decoding means connected to said register means for decoding said dial data supplied from said register means to thereby generate row and column data based on a dual tone multi-frequency (DTMF) system, said row and column data having a format different from that of said dial data;
   first generating means, connected to said decoding means, for generating a DTMF signal from said row and column data generated by said decoding means; and
   second generating means, connected to said register means, for generating a dial pulse signal from said dial data supplied from said register means.

2. A dial signal generator as claimed in claim 1, wherein said dial data is 4-bit dial data, and said decoding means comprises inverter means for generating first signals obtained by inverting said 4 bits of said dial data once and second signals obtained by inverting said 4 bits of said dial data twice, first NAND gate means for performing a NAND operation on said first and second signals to thereby generate logic signals, and second NAND gate means for performing NAND operation on said logic signals to thereby output said row and column data.

3. A dial signal generator as claimed in claim 2, wherein said inverter means comprises two inverters connected in series for each of said 4 bits of said dial data.

4. A dial signal generator as claimed in claim 2, wherein:
   said first NAND gate means comprises first to sixteenth NAND gates outputting first to sixteenth logic signals, respectively, said logic signals generated by said first NAND gate means including said first and sixteenth logic signals,
   a corresponding one of said first signals relating to a first bit of said 4-bit dial data is supplied to said first, third, fifth, seventh, ninth, eleventh, thirteenth and fifteenth NAND gates,
   a corresponding one of said second signals relating to said first bit of said 4-bite dial data is supplied to said second, fourth, sixth, eighth, tenth, twelfth, fourteenth and sixteenth NAND gates,
   a corresponding one of said first signals relating to a second bit of said 4-bit dial data is supplied to said first, second, fifth, sixth, ninth, tenth, thirteenth and fourteenth NAND gates,
   a corresponding one of said second signals relating to a second bit of said 4-bit dial data is supplied to said third, fourth, seventh, eighth, eleventh, twelfth, fifteenth and sixteenth NAND gates,
   a corresponding one of said first signals relating to a third bit of said 4-bit dial data is supplied to said first to fourth NAND gates, and said ninth and twelfth NAND gates,
   said corresponding one of the second signals relating to said third bit of said 4-bit dial data is supplied to said fifth to eighth NAND gates, and said thirteenth to sixteenth NAND gates,
   a corresponding one of said first signals relating to a fourth bit of said 4-bit dial data is supplied to said first to eighth NAND gates, and
   said corresponding one of the second signals relating to said fourth bit of said 4-bit dial data is supplied to said ninth to sixteenth NAND gates.

5. A dial signal generator as claimed in claim 4, wherein:
   said row data is defined by first to fourth row signals, and said column data is defined by first to fourth column signals,
   said second NAND gate means comprises seventeenth to twenty-fourth NAND gates,
   said seventeenth NAND gate is supplied with said second to fourth logic signals and said fourteenth logic signal, and generates said first row signal,
   said eighteenth NAND gate is supplied with said fifth to seventh logic signals and said fifteenth logic signal, and generates said second row signal,
   said nineteenth NAND gate is supplied with said eighth to tenth logic signals and said sixteenth logic signal, and generates said third row signal,
   said twentieth NAND gate is supplied with said first logic signal and said eleventh to thirteenth logic signals, and generates the fourth row signal,
   said twenty-first NAND gate is supplied and said second, fifth, eighth and twelfth logic signals, and generates said first column signal,
   said twenty-second NAND gate is supplied with said third, sixth, ninth and eleventh logic signals, and generates said second column signal,
   said twenty-third NAND gate is supplied with said fourth, seventh, tenth and thirteenth logic signals, and generates said third column signal, and
   said twenty-fourth NAND gate is supplied with said first logic signal and said fourteenth to sixteenth logic signals, and generates said fourth column signal.

6. A dial signal generator as claimed in claim 1, wherein said dial data is a 4-bit dial data, and said decoding means comprises inverter means for generating first signals obtained by inverting said 4 bits once and second signals obtained by inverting said 4 bits twice, NAND gate means for performing a NAND operation on said first and second signals relating to second to fourth bits on said 4-bit dial data to thereby generate logic signals, and logic gate means for performing a NAND operation on said logic signals and said first and second signals relating to a first bit of said 4-bit dial data to thereby output said row and column data.

7. A dial signal generator as claimed in claim 6, wherein:
   said NAND gate means comprises first to eighth NAND gates outputting first to eighth logic signals, respectively, said logic signals generated by said NAND gate means including said first and eight logic signals,
   said corresponding one of the first signals relating to said second bit of said 4-bit dial data is supplied to said first, third, fifth and seventh NAND gates,
   said corresponding one of the second signals relating to said second bit of said 4-bit dial data is supplied to said second, fourth, sixth and eighth NAND gates, said corresponding one of the first signals relating to said third bit of said 4-bit dial data is supplied to said first, second, fifth and sixth NAND gates, said corresponding one of the second signals relating to said third bit of said 4-bit dial data is supplied to said third, fourth, seventh and eighth NAND gates, said corresponding one of the first signals relating to said fourth bit of said 4-bit dial data is supplied to said first to fourth NAND gates, and said corresponding one of the second signals relating to said fourth bit of said 4-bit dial data is supplied to said fifth to eighth NAND gates.

8. A dial signal generator as claimed in claim 7, wherein:

said row data is defined by first to forth row signals, and said column data is defined by first to fourth column signals, said logic gate means comprises first to eighth gate means for outputting said first to fourth row signals and said first to fourth column signals, said first gate means is supplied with said corresponding one of the first signals relating to said first bit supplied from said inverter means, and said first, second and seventh logic signals, and generates said first row signal, said second gate means is supplied with said corresponding one of the second signals relating to said first bit supplied from said inverter means, and said third, fourth and eighth logic signals, and generates said second row signal, said third gate means is supplied with said corresponding one of the first signals relating to said first bit supplied from said inverter means, and said fourth, fifth and eighth logic signals, and generates said third row signal, said fourth gate means is supplied with said corresponding one of the second signals relating to said first bit supplied from said inverter means and said first, sixth and seventh logic signals, and generates said fourth row signal, said fifth gate means is supplied with said corresponding one of the first signals and said corresponding one of the second signals relating to said first bit supplies from said inverter means, and said first, third, fourth and sixth logic signals, and generates said first column signal, said sixth gate means is supplied with said corresponding one of the first signals and said corresponding one of the second signals relating to said first bit supplied from said inverter means, and said second, third, fifth and sixth logic signals, and generates said second column signal, said seventh means is supplied with said corresponding one of the first signals and said corresponding one of the second signals relating to said first bit supplied from said inverter means, and said second, fourth, fifth and seventh logic signals, and generates said third column signal, and said eighth means is supplied with said corresponding one of the first signals and said corresponding one of the second signals relating to said first bit supplied from said inverter means, and said first, seventh and eight logic signals, and generates said fourth column signal.

9. A computer telephone instrument comprising:

a central processing unit generating dial data corresponding to a dial number;

register means for storing said dial data generated by said central processing unit;

decoding means connected to said register means for decoding said dial data supplied from said register means to thereby generate row and column data based on a dual tone multi-frequency (DTMF) system, said row and column data having a format different from that of said dial data;

first generating means, connected to said decoding means, for generating a DTMF signal from said row and column data generated by said decoding means;

second generating means, connected to said register means, for generating a dial pulse signal from said dial data supplied from said register means;

a memory storing a control program for generating said dial data;

a switch provided in a transmission line extending from said computer controlled telephone instrument and controlled by said dial pulse signal;

network means, coupled to said transmission line and first generating means, for generating voice-level signal from said DTMF signal and for sending said voice-level signal to said transmission line;

a transmitter coupled to said transmission line through said network means; and a receiver coupled to said transmission line through said network means.

* * * * *